(12) United States Patent
McDonough et al.

(10) Patent No.: US 10,432,547 B2
(45) Date of Patent: Oct. 1, 2019

(54) VERIFYING FUNCTIONALITY RESTRICTIONS OF COMPUTING DEVICES

(71) Applicant: HEWLETT-PACKARD DEVELOPMENT COMPANY, L.P., Houston, TX (US)

(72) Inventors: William D. McDonough, Fort Collins, CO (US); Cyrille de Brebisson, Meyrin (CH); Tim Wessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 247 days.

(21) Appl. No.: 15/074,726

(22) Filed: Mar. 18, 2016

(65) Prior Publication Data
US 2017/0272377 A1 Sep. 21, 2017

(51) Int. Cl.
| | | |
|---|---|---|
| *G06F 15/177* | (2006.01) | |
| *H04L 12/911* | (2013.01) | |
| *H04L 12/24* | (2006.01) | |
| *H04L 29/08* | (2006.01) | |
| *G06F 21/44* | (2013.01) | |

(52) U.S. Cl.
CPC ............. *H04L 47/70* (2013.01); *G06F 21/44* (2013.01); *H04L 41/0816* (2013.01); *H04L 67/06* (2013.01)

(58) Field of Classification Search
CPC ...... G06F 21/44; H04L 41/0816; H04L 67/06
USPC ......... 709/221, 206, 203; 713/170, 171, 156
See application file for complete search history.

(56) References Cited

U.S. PATENT DOCUMENTS

| | | | |
|---|---|---|---|
| 6,312,363 B1 * | 11/2001 | Watterson .......... | A63B 22/0235 482/54 |
| 8,095,125 B2 | 1/2012 | Niimi | |
| 8,718,633 B2 | 5/2014 | Sprigg et al. | |
| 2002/0051537 A1 * | 5/2002 | Rogaway .............. | H04L 9/0643 380/46 |
| 2002/0093189 A1 * | 7/2002 | Krupa ................ | B42D 15/0053 283/81 |
| 2004/0015748 A1 * | 1/2004 | Dwyer .................... | G06F 8/437 714/52 |
| 2004/0127335 A1 * | 7/2004 | Watterson .......... | A63B 22/0235 482/8 |
| 2005/0175109 A1 * | 8/2005 | Vetro ................... | H04N 19/147 375/240.28 |

(Continued)

OTHER PUBLICATIONS

Santos, Nuno, et al., "A Case for Enforcing App-Specific Constraints to Mobile Devices by Using Trust Leases", INESC-ID/ Instituto Superior Tecnico, Universidade de Lisboa, Apr. 21, 2015. 6 pages.

*Primary Examiner* — Thuong Nguyen
(74) *Attorney, Agent, or Firm* — Brooks Cameron & Huebsch PLLC (57) ABSTRACT

The present subject matter relates to verifying functionality restrictions of a computing device. In an example implementation, the verification includes generating a notification message based on a verification code received in the computing device and status of a configuration mode in the computing device. When the status of the configuration mode is active, at least one functionality of the computing device is restricted. The configuration mode can be activated in the computing device by execution of a configuration file. The generated notification message is provided, which enables verifying that the at least one functionality of the computing device is restricted.

14 Claims, 5 Drawing Sheets

(56) References Cited

U.S. PATENT DOCUMENTS

| | | | |
|---|---|---|---|
| 2005/0188201 A1* | 8/2005 | Sala | G06Q 30/00 713/170 |
| 2006/0114792 A1* | 6/2006 | Uno | G11B 7/0065 369/103 |
| 2006/0132802 A1* | 6/2006 | Chung | G01B 11/2527 356/603 |
| 2006/0226797 A1* | 10/2006 | Bohne | G01D 5/32 315/317 |
| 2007/0046924 A1* | 3/2007 | Chang | G01C 7/00 356/3.01 |
| 2007/0098234 A1* | 5/2007 | Fiala | G06K 9/3216 382/120 |
| 2007/0113079 A1* | 5/2007 | Ito | G06F 9/468 713/166 |
| 2007/0142068 A1 | 6/2007 | Matsuo | |
| 2009/0259705 A1* | 10/2009 | Kailas | G06F 7/58 708/255 |
| 2010/0232618 A1* | 9/2010 | Haartsen | H04L 1/0003 381/80 |
| 2010/0266001 A1* | 10/2010 | Choi | H04M 11/066 375/222 |
| 2011/0065375 A1 | 3/2011 | Bradley | |
| 2011/0310131 A1* | 12/2011 | Fergason | G09G 3/3406 345/690 |
| 2012/0105204 A1* | 5/2012 | Van Beeck | H05B 37/0227 340/8.1 |
| 2012/0172012 A1* | 7/2012 | Sumcad | H04W 4/12 455/414.1 |
| 2012/0187185 A1* | 7/2012 | Sayan | G06Q 30/0601 235/375 |
| 2012/0291103 A1* | 11/2012 | Cohen | G06F 21/6218 726/4 |
| 2013/0234850 A1* | 9/2013 | Lee | A61B 5/02 340/539.12 |
| 2013/0261777 A1* | 10/2013 | Woodman | H04N 21/233 700/94 |
| 2015/0009043 A1* | 1/2015 | Quinlan | H04L 67/12 340/870.3 |
| 2015/0245038 A1* | 8/2015 | Clatanoff | H04N 9/3179 345/545 |
| 2015/0372879 A1* | 12/2015 | Mori | H04L 63/107 709/203 |
| 2016/0267195 A1* | 9/2016 | Iizuka | G06Q 10/20 |
| 2017/0117958 A1* | 4/2017 | Golcher Ugalde | H05K 999/99 |

* cited by examiner

VERIFYING FUNCTIONALITY RESTRICTIONS OF COMPUTING DEVICES

BACKGROUND

Computing devices have several functionalities. At times, some functionalities of computing devices have to be restricted. For example, during an examination, internet access functionality of a computing device used by an examinee is to be restricted. To restrict functionalities, computing devices can be operated in various configuration modes in which one or more functionalities of the computing devices are restricted. For example, in an examination mode of a computing device, the internet access functionality is restricted.

BRIEF DESCRIPTION OF DRAWINGS

The following detailed description references the figures, wherein.

DETAILED DESCRIPTION

Computing devices are used in a variety of applications as they have a large number of functionalities. During certain situations, some functionalities of the computing devices have to be restricted. For example, during an examination, internet access may have to be restricted on a calculator used by an examinee. Similarly, signal transmitting functionality of mobile devices is to be restricted in secure areas. To restrict one or more functionalities in a computing device, the computing device can be operated in a configuration mode in which the one or more functionalities are restricted. For example, when the internet access functionality of the computing device is to be restricted, the computing device can be operated in an examination configuration mode.

A configuration mode can be configured in a computing device manually or automatically. For example, in the case of an examination, a proctor can manually restrict internet access functionality in the computing device of each examinee. However, this is a time consuming procedure, particularly when the number of examinees is large. Further, this procedure is error prone, as the proctor may forget to configure a computing device to operate in a restricted functionality mode.

To ensure that computing devices are operated in a configuration mode, computing devices in the configuration mode can be provided to users. For example, during examinations, calculators preset in examination modes can be provided to examinees. However, in an examination taken by a large number of candidates, providing a large number of computing devices may not be feasible. Further, a candidate may circumvent the restriction by bringing a personal computing device that is not operating in the correct or approved configuration mode.

Another method for operating the computing device in the configuration mode involves providing a configuration file to the computing device and asking user of the computing device to execute it. The configuration file, when executed in the computing device, automatically activates the configuration mode in the computing device. In other words, the configuration file restricts functionalities of the computing device that are to be restricted for the corresponding configuration mode. However, it cannot be verified whether the computing device is operating in the configuration mode. In other words, it is not possible to verify whether the user of the computing device executed the provided configuration file in the computing system.

To verify that the configuration file is executed in the computing device, an indication corresponding to an executed configuration file may be provided. The indication can be used to identify whether the configuration file is executed in the computing device or not. However, by running a program in the computing device that mimics the indication provided when the configuration file is executed, this verification may be circumvented. For example, a student in an examination can run the program instead of the configuration file to generate the indication, thereby misleading a proctor into believing that the configuration file is executed.

The present subject matter relates to methods and systems for verifying functionality restrictions of computing devices. The described methods and systems of the present subject matter enable ensuring that functionalities of a computing device that are to be restricted are, in fact, restricted. The described systems and methods may be implemented in various computing devices including handheld computing devices used for examinations.

In accordance with an example implementation of the present subject matter, a verification code is received in a computing device. Further, a status of a configuration mode of the computing device is determined. The status of the configuration mode can be active or inactive. When the status of the configuration mode is active, at least one functionality of the computing device is restricted. A notification message is generated based on the verification code and status. The notification message is then provided to a proctor. Based on the notification message, the proctor can verify that the at least one functionality of the computing device is restricted.

In accordance with an example implementation of the present subject matter, a configuration file is received in a computing device. The configuration file is to be executed in the computing device for operating the computing device in a configuration mode in which at least one functionality of the computing device is restricted. A notification message is generated based on an executed configuration file and a verification code received in the computing device. The notification message is provided to verify that the received configuration file is executed on the computing device.

Since a notification message is generated based on functionality restrictions of a computing device, the methods and systems of the present subject matter enable verifying that the functionalities of the computing device are restricted. Further, generating the notification message based on a verification code and the functionality restrictions of the computing device ensures that the notification message cannot be mimicked by executing a program or any other configuration file with little or no functionality restrictions.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Example implementations of the present subject matter are described with a computing device used during an examination. However, the methods and systems of the present subject matter can be used, as will be evident, in other computing devices used in situations where functionalities of the computing devices are to be verifiably restricted.

Figure 1:
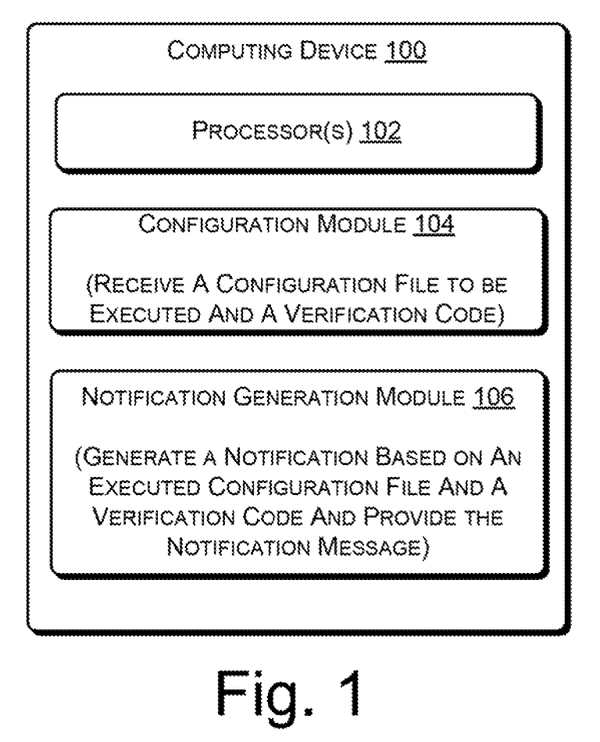
FIG. 1 illustrates a computing device that is to provide a notification message to verify whether a received configuration file is executed on the computing device, according to an example implementation of the present subject matter.

FIG. 1 illustrates a computing device that is to provide a notification message to verify whether a received configuration file is executed on the computing device, according to an example implementation of the present subject matter. As illustrated, a computing device 100 includes processor(s) 102, a configuration module 104, and a notification generation module 106. Further, the computing device 100 may also include interface(s), memory, other modules, and system data, which are not shown in FIG. 1. The computing device 100 may be implemented as any of a variety of computing systems, such as a calculator, a desktop computer, a laptop computer, a tablet, and the like.

The processor(s) 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in a memory. The functions of the processor 102 may be provided through the use of dedicated hardware as well as hardware capable of executing machine readable instructions.

The configuration module 104, the notification generation module 106, and the other modules may be coupled to and/or be executable by the processor(s) 102, and may include, amongst other things, routines, programs, objects, components, data structures, and the like, which perform particular tasks or implement particular abstract data types. The other modules may include programs or coded instructions that supplement applications and functions, for example, programs in the operating system, of the computing device 100. Though shown as separate modules, it will be understood that in other implementations, the configuration module 104 and the notification generation module 106 may be implemented as a single module.

The interface(s) may include a variety of machine readable instructions-based interfaces and hardware interfaces that allow interaction with a user and with other communication and computing devices, such as network entities, web servers, and external repositories, and peripheral devices. The memory may include any non-transitory computer-readable medium including, for example, volatile memory (e.g., RAM), and/or non-volatile memory (e.g., EPROM, flash memory, Memristor, etc.). The memory may also be an external memory unit, such as a flash drive, a compact disk drive, an external hard disk drive, or the like.

The system data may serve as a repository for storing data that may be fetched, processed, received, or created by the configuration module 104, the notification generation module 106, and the other modules or received from connected computing systems and storage devices.

In operation, the computing device 100 has a plurality of functionalities. For example, if the computing device 100 is a calculator, it may have a calculus functionality, a trigonometric functionality, an algebraic functionality, a graphing functionality, and the like. At times, some functionalities of the computing device 100 are to be restricted. For example, during an examination on calculus, the calculus functionality of a calculator is to be restricted, so that the knowledge of an examinee in calculus can be tested. For this, a configuration file may be sent to the computing device 100, which can be received by the configuration module 104. The configuration file received by the configuration module 104 is hereinafter referred to as received configuration file. The received configuration file when executed in the computing device 100 restricts at least one functionality of the computing device 100, for example the calculus functionality. The received configuration file can restrict the at least one functionality, for example, by restricting lines of codes that are associated with the at least one functionality.

In addition to the received configuration file, the computing device 100 may have other configuration files. Each configuration file can be used to restrict different functionalities of the computing device 100 when they are executed. For example, a first configuration file can restrict calculus and algebra functionalities, while a second configuration file can restrict the algebra functionality. Some configuration files may not restrict any functionality. Based on the configuration file executed in the computing device 100, different functionalities of the computing device 100 will be restricted.

The notification generation module 104 determines a configuration file that is executed in the computing device 100. The configuration file that is executed in the computing device 100 is hereinafter referred to as an executed configuration file. The executed configuration file can be same or different from the received configuration file.

The notification generation module 106 generates a notification message based on the executed configuration file and a verification code received in the computing device 100. The verification code can include, but is not restricted to, a digit, a number, an alphabet, a word, and a sentence. In an example, the computing device 100 is used during an examination, and the verification code is provided by the proctor of the examination. The verification code is to be input to the computing device 100 by an examinee using the computing device 100.

The generated notification message on the computing device 100 may be provided to a proctor. The proctor can be a person who is responsible for checking functionality restrictions of the computing device 100. In other examples, the proctor can be an automated verification system.

In an example, the notification message can be provided by displaying the notification message as a unique pattern on the computing device 100. The unique pattern can be displayed, for example, as a lighting sequence on light emitting diodes (LEDs) of the computing device 100. In another example, the unique pattern is displayed on a display screen of the computing device 100 as a sequence of images. Other ways of providing the generated notification message are also envisaged, such as an audio notification, an email notification, an instant messaging notification, and the like to the proctor.

Since the notification message is generated based on the executed configuration file and the verification code, it can be verified whether the received configuration file is executed in the computing device 100 or not. For example, by looking at the unique lighting sequence of the LEDs of the computing device 100, the proctor of the examination can verify whether the received configuration file has been executed in the computing device 100 or not.

In an example, the unique pattern is generated corresponding to a checksum generated for the executed configuration file and the verification code. The checksum is a mathematical function whose output varies significantly for small variations of the input. The checksum can be, but is not restricted to, an 8-bit checksum.

Since the notification message is generated based on both the verification code and the executed configuration file, to mimic the correct notification message (the notification message generated when the received configuration file is executed), the verification code is to be known. Thus, when the verification code is provided just before the notification message is to be generated, generating a less restrictive configuration file (that restricts lesser functionalities that that of the received configuration file) which when executed provides the correct notification message may not be possible. For example, when the proctor provides a random number verification code just before the commencement of an examination, an examinee cannot readily create the less restrictive configuration file. If a previously created less restrictive configuration file is executed, the generated notification message may not be the same as the correct notification message. Thus, based on the provided notification message, the proctor can identify whether the examinee has executed the received configuration file or not.

Figure 2A:
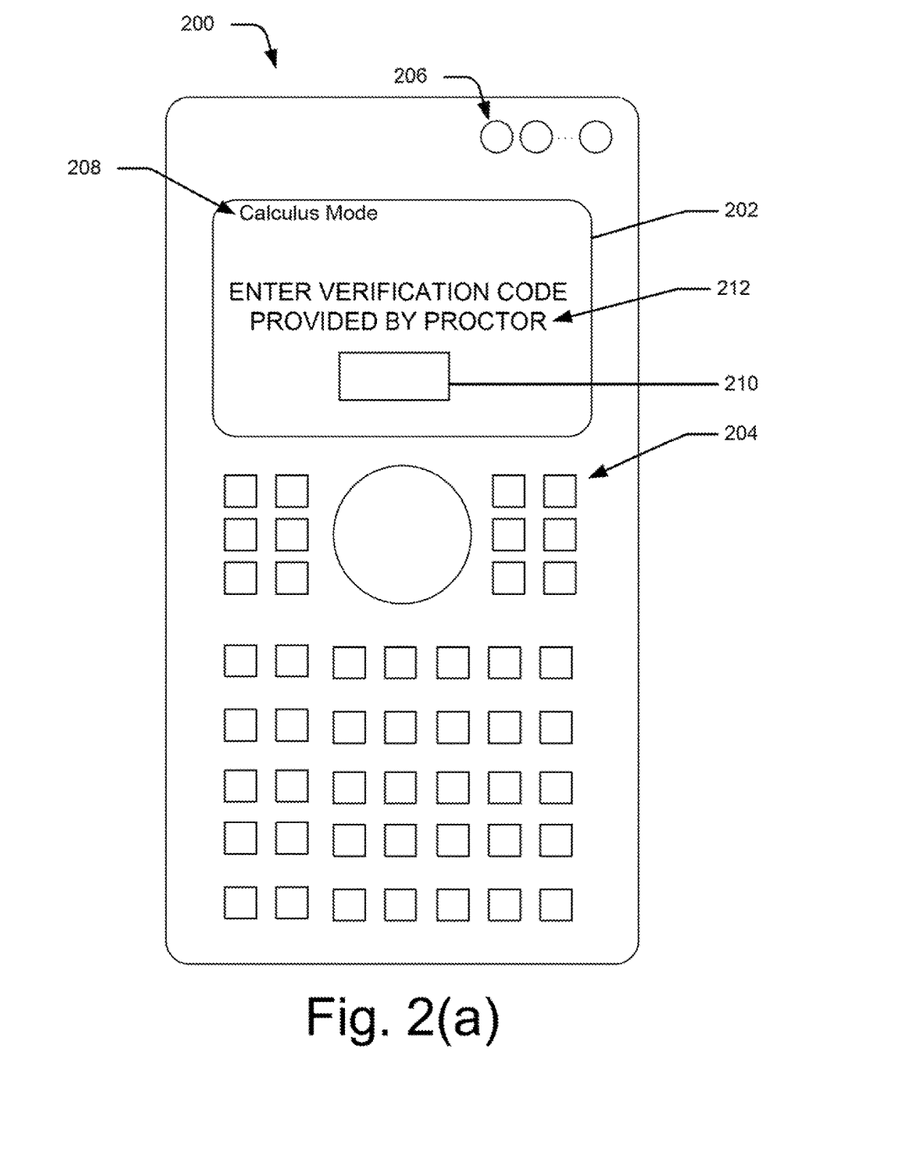
FIGS. 2(a) and 2(b) illustrate a calculator that is to provide a notification message for verifying functionality restrictions in the calculator, according to example implementations of the present subject matter.
Figure 2B:
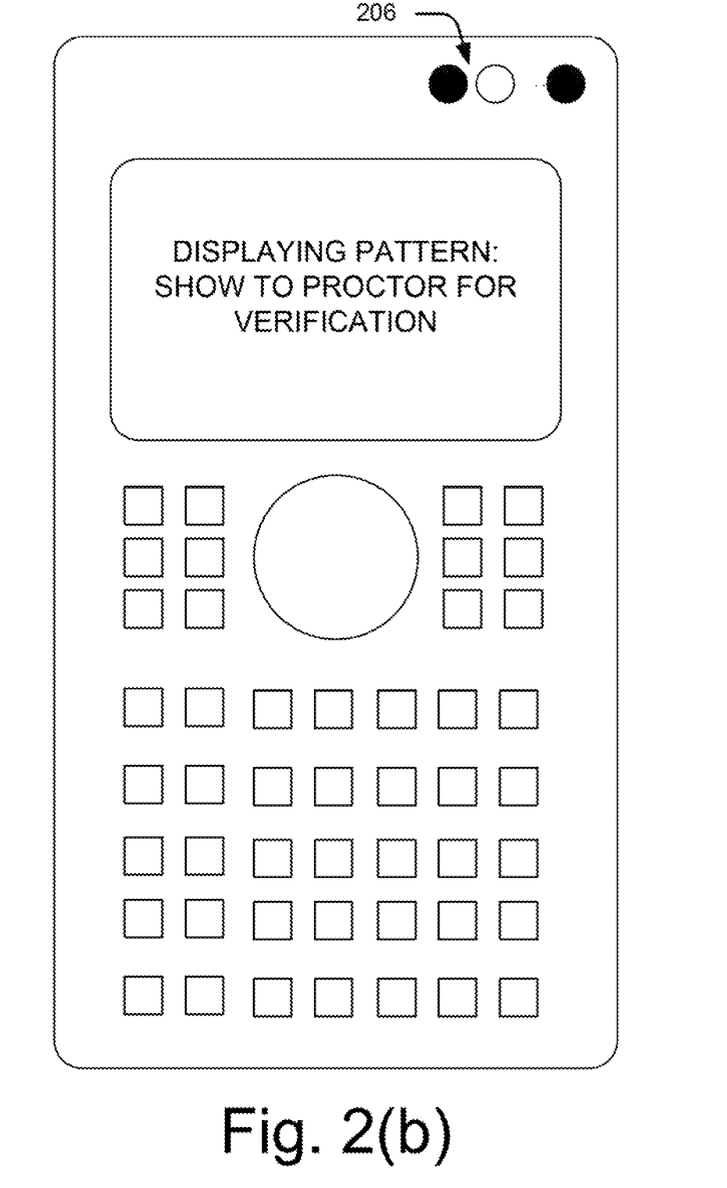

FIGS. 2(*a*) and 2(*b*) illustrate a calculator to provide a notification message for verifying functionality restrictions in the calculator, according to an example implementation of the present subject matter. A calculator 200, such as a calculator, is used in an examination for performing mathematical, logical, and complex operations and the like. The calculator 200 can include several functionalities, which can include, but are not restricted to, apps, notes, programs, graphing, and math. The functionalities can also include specific academic subjects, such as algebra, geometry, and calculus. Further, the functionalities can also include specific topics within an academic subject. For example, the specific topics can include, but are not restricted to, limits, functions, and derivatives within the academic subject calculus. The calculator 200 includes a display 202, keys 204, and LEDs 206.

As explained earlier, during the examination, some functionalities of the calculator 200 are to be restricted, which may be achieved by execution of a configuration file that restricts the functionalities to be restricted in the calculator 200. The configuration file may be sent to the calculator 200, for example, by the proctor. Before the start of the examination, the proctor may instruct the examinees, such as the examinee using the calculator 200, to execute the received configuration file in their respective computing devices. On execution of the configuration file, the calculator 200 is set to a configuration mode, which corresponds to the functionality restrictions associated with the execution of the configuration file. The configuration mode of the calculator 200 is hereinafter referred to as active configuration mode. The active configuration mode may be displayed on the display 202, as illustrated by 208.

The proctor may then announce a verification code, such as a random number, for entering to the calculator 200. The verification code is to be entered to the calculator 200, for example, in a text box 210. In an example, the text box 210 and an instruction 212 to enter the verification code can be provided on the display 202 once the configuration file is executed in the calculator 200. Once the verification code is entered, the calculator 200 generates a notification message. In an example, the notification message is generated by system(s) as described earlier in conjunction with description of FIG. 1. The notification message is then provided to verify that the received configuration file is executed on the calculator 200. As explained earlier, for providing the notification message, the notification message can be displayed as a lighting sequence on LEDs 206 of the calculator 200.

As will be understood, the higher the number of LED lighting sequences (or other unique patterns), the higher will be the confidence of the proctor looking at a correct LED lighting sequence that the correct LED lighting sequence is displayed due to the execution of the received configuration file, and not due to the execution of another configuration file that happens to provide the correct LED lighting sequence. In other words, the probability of a random configuration file displaying the correct LED lighting sequences decreases with an increase in the number of LED lighting sequences. In an example, if the number of unique patterns is about one hundred, the proctor can be more than 95% confident that the received configuration file is executed in a computing device.

FIG. 2(*b*) illustrates displaying a lighting sequence on the LEDs of the computing device, according to an example implementation of the present subject matter. The lighting sequence displayed on the LEDs 206 can include a plurality of states, such as an on state, an off state, a blinking fast state, and a blinking slow state. In the example shown in FIG. 2(*b*), a first LED and a last LED of the LEDs 206 are in an on state and the second LED is in an off state. If the correct pattern was, say, an off state of the first and the third LEDs and an on state of the second LED, the proctor looking at the calculator 200 will recognize that the calculator 200 is displaying a wrong lighting sequence, and can understand that the received configuration file is not executed in the calculator 200.

In an example implementation, the lighting sequence of the LEDs 206 may correspond to bits of a checksum. For example, to display four different states (e.g., on, off, slow blink, fast blink) of each LED, two bits of the checksum are used, so that each of the four values provided by the two bits (00, 01, 10, and 11) corresponds to one state. Therefore, for three LEDs displaying the lighting sequence, each having four states, a total of six bits is used. In such a case, the notification generation module 106 generates the checksum with six bits based on the verification code and the executed configuration file. Although FIGS. 2(*a*) and 2(*b*) are explained with the help of a calculator, it will be understood that the subject matter can be used with any type of computing device in which functionalities are to be restricted. Although FIGS. 2(*a*) and 2(*b*) are explained with the help of three LEDs and four states for each of the three LEDs, it will be understood that any number of LEDs and any number of different states of the LEDs can be used to display the unique pattern.

Figure 3:
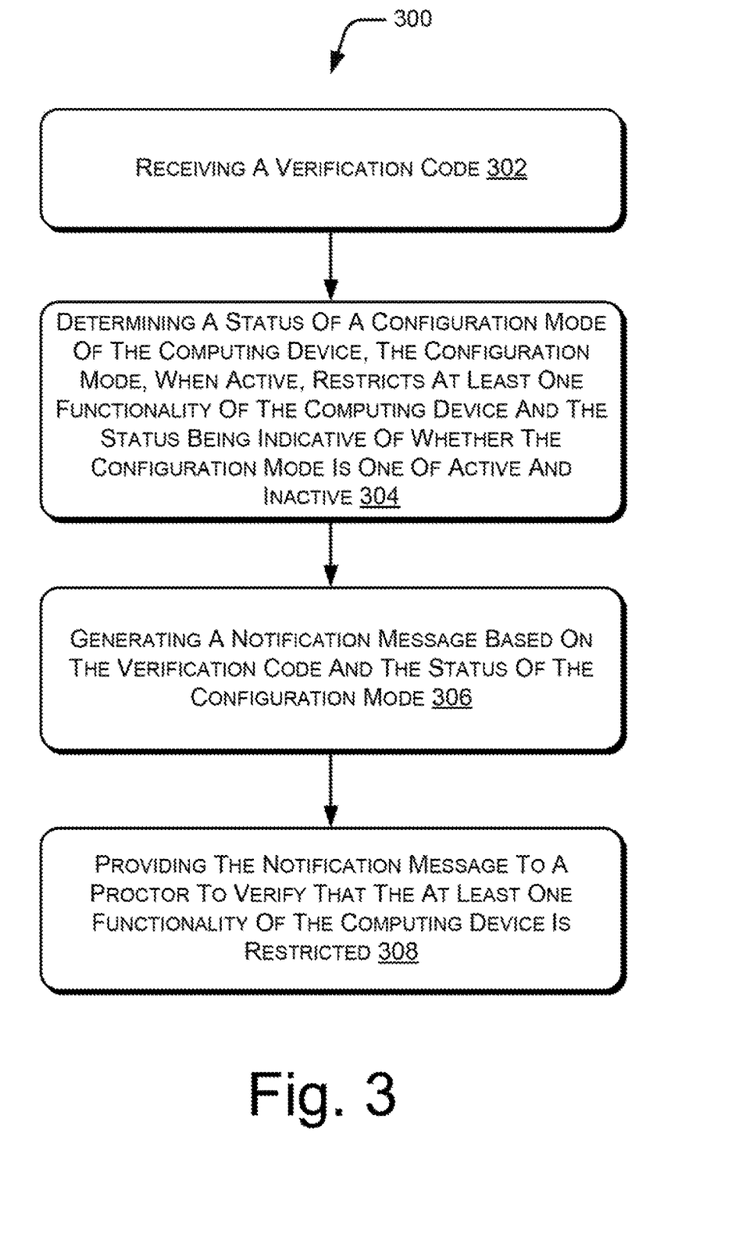
FIG. 3 illustrates a method to verify whether at least one functionality of a computing device is restricted, according to an example implementation of the present subject matter.

FIG. 3 illustrates a method to verify whether at least one functionality of a computing device is restricted, according to an example implementation of the present subject matter.

The order in which the method 300 is described is not intended to be construed as a limitation, and any number of the described method blocks may be combined in any order to implement the method 300, or an alternative method. Furthermore, the method 300 may be implemented by processor(s) or computing device(s) through any suitable hardware, non-transitory machine readable instructions, or a combination thereof.

It may be understood that steps of the method 300 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 300 may be implemented in a variety of systems; the method 300 is described in relation to the aforementioned computing device 100, for ease of explanation.

Referring to method 300, at block 302, a verification code is received by a computing device. The verification code can be, for example, a random number provided by a proctor. The computing device can be, for example, a calculator. In an implementation, the verification code is received by the configuration module 104.

At block 304, a status of a configuration mode in the computing device is determined. The status of the configuration mode indicates whether the configuration mode is active or is inactive. When the configuration mode is active, at least one functionality of the computing device is restricted. For example, if the configuration mode is a calculus mode, a calculus functionality of the computing device is restricted. In an implementation, the determination of the status is performed by identifying execution of a configuration file which when executed activates the configuration mode. The configuration file can be provided by the proctor.

At block 306, a notification message is generated based on the verification code and the status of the configuration mode. In an implementation, the generation of the notification message involves generating a checksum for the verification code and the configuration file when the configuration file is executed. If the configuration file is not executed, i.e., if the status of the configuration mode is inactive, the notification message can be, for example, a zero value, or any other value that is different from the notification message generated for the active status of the configuration mode.

At block 308, the notification message is provided. The notification message can be provided by, for example, displaying a unique pattern or playing a unique audio on the computing device to the proctor. In an example, the unique pattern is a lighting sequence of LEDs on the computing device. For example, in case the configuration mode is in an inactive status, the lighting sequence can be an off state of the LEDs, or any lighting sequence different from the lighting sequence displayed in case of active status of the configuration mode.

Since the notification message is generated based on status of the configuration mode and the verification code, a proctor can verify that the configuration mode is active in the computing device, i.e., that the at least one functionality is restricted. For example, the proctor knowing the correct lighting sequence of the LEDs (lighting sequence generated for the active status of the configuration mode) can recognize if the lighting sequence of the LEDs is different from the correct lighting sequence. Thus, the proctor can recognize that the configuration mode is in an inactive status in the computing device, and the at least one functionality is not restricted.

Figure 4:
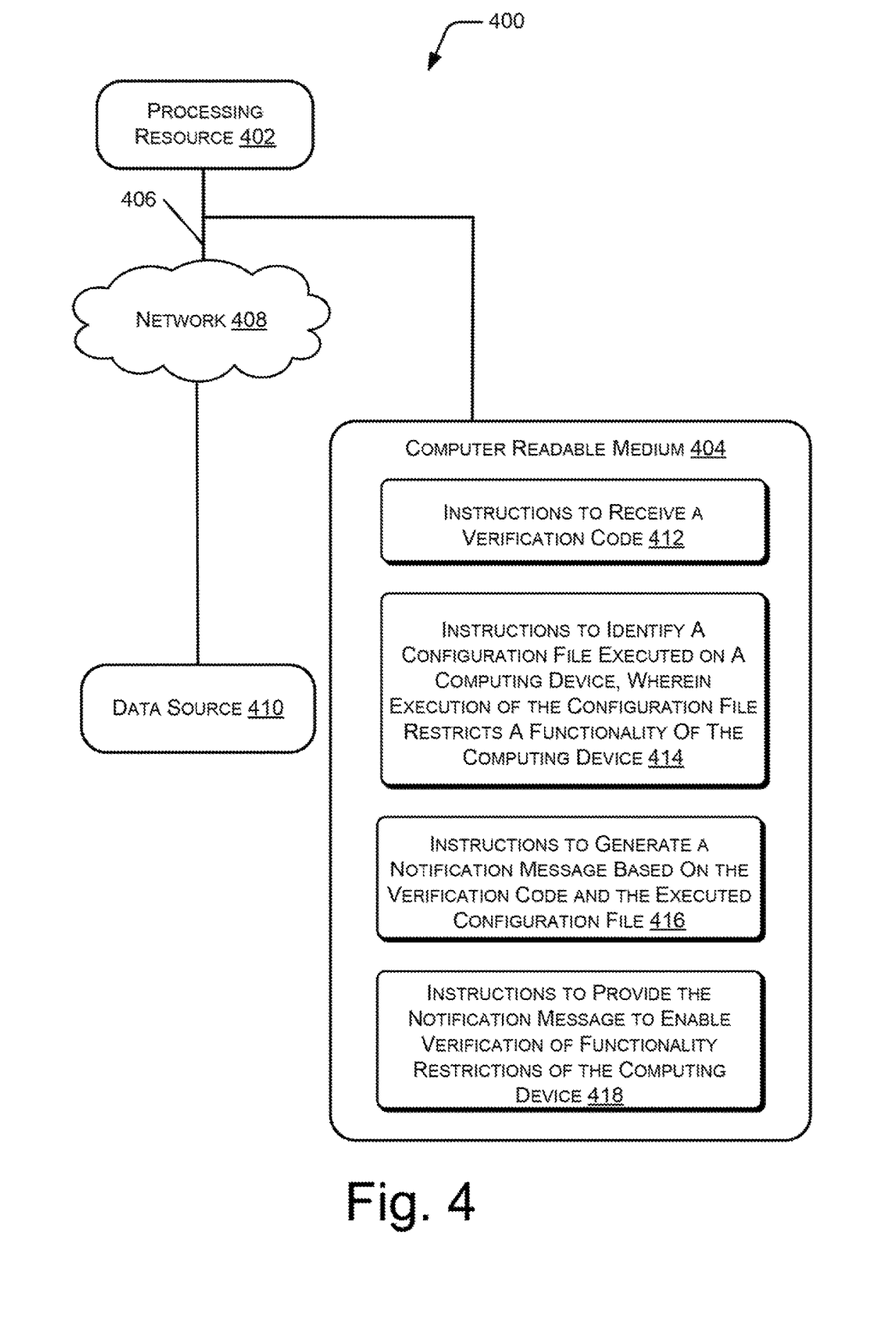
FIG. 4 illustrates a networking environment for verifying functionality restrictions of a computing device, according to an example implementation of the present subject matter.

FIG. 4 illustrates a network environment 400, according to an example implementation of the present subject matter. The network environment 400 includes processing resource(s) or processor(s) 402 of a network entity communicatively coupled to a non-transitory computer readable medium 404 through a communication link 406. In an example, the processor(s) 402 may have one or more processing resources for fetching and executing computer-readable instructions from the non-transitory computer readable medium 404. The processor(s) 402 may be a processor of a network entity in the network environment 400.

The non-transitory computer readable medium 404 can be, for example, an internal memory device or an external memory device. In an example implementation, the communication link 406 may be a direct communication link, such as any memory read/write interface. In another example implementation, the communication link 406 may be an indirect communication link, such as a network interface. In such a case, the processor(s) 402 can access the non-transitory computer readable medium 604 through a network 408. The network may be a single network or a combination of multiple networks and may use a variety of different communication protocols.

The processor(s) 402 and the non-transitory computer readable medium 404 may also be communicatively coupled to data source 410 over the network. The data source 410 can include, for example, source devices and destination devices.

In an example implementation, the non-transitory computer readable medium 404 includes a set of computer readable instructions to enable verification of functionality restrictions of a computing device, such as the computing device 100. The set of computer readable instructions can be accessed by the processor(s) 402 through the communication link 406 and subsequently executed to perform acts to enable verification of the functionality restrictions of the computing device.

Referring to FIG. 4, in an example, the non-transitory computer readable medium 404 includes instructions 412 that cause the processor(s) 402 to receive a verification code. The verification code can be a random number.

The non-transitory computer readable medium 404 includes instructions 414 that cause the processor(s) 402 to identify a configuration file executed on the computing device. The execution of the configuration file restricts a functionality of the computing device. The configuration file may be stored in the data source 410.

In an implementation, the non-transitory computer readable medium 404 includes instructions 416 that cause the processor(s) 402 to generate a notification message based on the verification code and the executed configuration file. To generate the notification message, the instructions 416 can cause the processor(s) 402 to generate a checksum for the verification code and the executed configuration file. The instructions 416 can further cause the processor(s) 402 to generate a unique pattern corresponding to the checksum.

The non-transitory computer readable medium 404 includes instructions 418 that cause the processor(s) 402 provide the notification message. To provide the notification message, the instructions 418 can cause the processor(s) 402 to display the unique pattern on the computing device. The notification message can be provided to the proctor. The proctor can utilize the notification message to verify the functionality restrictions on the computing device.

Although implementations of systems and methods for verifying functionality restrictions of a computing device have been described in language specific to structural features and/or methods, it is to be understood that the present subject matter is not necessarily limited to the specific features or methods described. Rather, the specific features and methods are disclosed and explained as example implementations.

We claim:

1. A method comprising:
   receiving, by a first computing device, a verification code, wherein of the verification code is a phrase or a number of random alphanumeric characters received by the first computing device;
   determining, by the first computing device, whether a configuration file received from a second computing device has been executed;
   determining, by the first computing device, a status of a configuration mode of the first computing device based on whether the configuration file has been executed to restrict at least one functionality of the first computing device;
   generating, by the first computing device in response to the configuration file having been executed, a checksum from the verification code and the executed configuration file to generate a notification message;
   generating, by the first computing device, a unique pattern from the checksum, wherein generating the unique pattern includes lighting light emitting diodes (LEDs) on the first computing device according to corresponding bits of the checksum included in the notification message; and
   providing, by the first computing device, the unique pattern to a proctor for indicating that the at least one functionality of the first computing device is restricted.

2. The method of claim 1, wherein the verification code is provided by the proctor.

3. The method of claim 1, wherein execution of the configuration file activates the configuration mode in the first computing device, wherein the configuration mode includes operating the first computing device with the at least one functionality restricted.

4. The method of claim 3, wherein the configuration file is received from a computing device of the proctor, wherein the proctor computing device is the second computing device.

5. The method of claim 1, wherein providing the unique pattern on the first computing device to the proctor comprises generating a unique sequence of lighting at the first computing device visible to the proctor.

6. The method of claim 5, wherein generating the unique sequence of lighting includes selecting a lighting state for each of a plurality of light emitting diodes (LEDs) according to a portion of the checksum.

7. The method of claim 1, wherein providing the unique pattern on the first computing device to the proctor further comprises playing a unique audio pattern according to corresponding bits of the checksum.

8. A first computing device comprising:
   a processor;
   instructions executable by the processor to:
   receive a verification code, wherein the verification code is a phrase or a number of random alphanumeric characters received by the first computing device;
   determine, by the first computing device, whether a configuration file received from a second computing device has been executed;
   determine, by the first computing device, a status of a configuration mode of the first computing device based on whether the configuration file has been executed to restrict at least one functionality of the first computing device;
   generate, by the first computing device, a checksum from the verification code and the configuration file to generate a notification message in response to the configuration file having been executed;
   generate, by the first computing device, a unique pattern from the checksum, wherein generating the unique pattern includes selecting a lighting state for each of a plurality of light emitting diodes (LEDs) according to a portion of the checksum included in the notification message; and
   provide, by the first computing device, the unique pattern for indicating the received configuration file is executed on the first computing device.

9. The computing device of claim 8, wherein the instructions are executable to display the unique pattern on the computing device to a proctor for verifying the execution of the received configuration file on the computing device.

10. The computing device of claim 8, further comprising LEDs light emitting diodes (LEDs) to display the unique pattern as a lighting sequence.

11. The computing device of claim 8, further comprising a display to display the unique pattern as a sequence of images.

12. The computing device of claim 8, wherein the unique pattern includes a lighting pattern corresponding to the checksum.

13. A non-transitory computer-readable medium comprising instructions executable by a processing resource to:
   receive a verification code at a first computing device, wherein the verification code is a phrase or a number of random alphanumeric characters received by the first computing device;
   determine, by the first computing device, whether a configuration file received from a second computing device has been executed;
   determine, by the first computing device, a status of a configuration mode of the first computing device based on whether the configuration file has been executed to restrict at least one functionality of the first computing device;
   generate, by the first computing device, a checksum from the verification code and the executed configuration file to generate a notification message in response to the configuration file having been executed;
   generate, by the first computing device, a unique pattern from the checksum, wherein generating the unique pattern includes selecting a lighting state for each of a plurality of light emitting diodes (LEDs) according to a portion of the checksum included in the notification message; and
   provide the unique pattern to a proctor to verify, by a comparison to a correct unique pattern determined from the verification code and the executed configuration file, the functionality restrictions on the first computing device.

14. The non-transitory computer-readable medium of claim 13, wherein the instructions to provide the unique pattern to the proctor include instructions executable by the processing resource to:
   display the unique pattern on a display mechanism of the first computing device visible to the proctor.

* * * * *

UNITED STATES PATENT AND TRADEMARK OFFICE
CERTIFICATE OF CORRECTION

PATENT NO. : 10,432,547 B2
APPLICATION NO. : 15/074726
DATED : October 1, 2019
INVENTOR(S) : William D. Mcdonough et al.

Page 1 of 1

It is certified that error appears in the above-identified patent and that said Letters Patent is hereby corrected as shown below:

In the Claims

In Column 10, Line 20, in Claim 10, after "LEDs" delete "light emitting diodes (LEDs)".

In Column 10, Lines 62-63, in Claim 14, delete "display the unique pattern on a display mechanism of the first computing device visible to the proctor." and insert -- play the unique audio pattern on an audio mechanism of the first computing device audible to the proctor. --, therefor.

Signed and Sealed this
Tenth Day of March, 2020

Andrei Iancu
*Director of the United States Patent and Trademark Office*